UNITED STATES PATENT OFFICE.

COURTNEY CONOVER, OF PHILADELPHIA, PENNSYLVANIA, AND HARRY D. GIBBS, OF SAN FRANCISCO, CALIFORNIA.

PROCESS FOR THE PURIFICATION OF CRUDE PHTHALIC ANHYDRID.

1,301,388.

Specification of Letters Patent.   Patented Apr. 22, 1919.

No Drawing.   Application filed June 29, 1918.  Serial No. 242,631.

(FILED UNDER THE ACT OF MARCH 3, 1883, 22 STAT. L., 625.)

*To all whom it may concern:*

Be it known that we, COURTNEY CONOVER and HARRY D. GIBBS, citizens of the United States of America, residing in the city of Philadelphia, county of Philadelphia, State of Pennsylvania, and in the city of San Francisco, county of San Francisco, State of California, respectively, (whose post-office address is Washington, D. C.,) have invented a new and useful Process for the Purification of Crude Phthalic Anhydrid, of which the following is a specification.

This application is made under the act of March 3, 1883, chapter 143 (22 Stat., L. 625), and the invention herein described and claimed may be used by the Government of the United States or any of its officers or employees in the prosecution of work for the Government, or any person in the United States, without payment to us of any royalty thereon.

Our invention relates to a process for the purification of phthalic anhydrid.

It is well known that phthalic anhydrid, substantially pure, is commonly produced by the sublimation of crude or impure phthalic anhydrid or phthalic acid. This process is expensive and often results in loss of the phthalic anhydrid. The object of our invention is to provide a process which shall be inexpensive, shall result in little loss of valuable products, and which shall be free from other objectionable features of the processes employed at present.

Our invention consists in substance in the production of pure phthalic anhydrid by dissolving the crude or impure anhydrid in a non-aqueous solvent at a temperature somewhat above ordinary room temperature, filtering out such impurities as are insoluble, decolorizing the solution obtained by means of a substance capable of adsorbing color from non aqueous solution, crystallizing out phthalic anhydrid by lowering the temperature of the solution, crystallizing out phthalic anhydrid mixed with the accompanying impurities by again lowering the temperature, and later separating most of the impurities practically free from phthalic anhydrid by further reductions of temperature.

To illustrate the practical operation of our process we shall describe in detail the preferred procedure. Crude phthalic anhydrid containing such impurities as are commonly present, including highly colored compounds, naphthalene sulfonic acids and naphthalene, is dissolved in carbon tetrachlorid which has previously been used in this process and which contains small quantities of the impurities in solution. The solution is brought about at a temperature between 50 and 70° centigrade, the preferred temperature being about 70°. The solution is brought about in a tank of such design and with such connections and accessories that its contents may be held at the desired temperature (70°), that the solvent may be passed into it continuously, that the solution leaving it must pass through a filter, and that it may be opened to receive successive charges of crude phthalic anhydrid or for the removal of material from the filter. More than one of these tanks connected in series are used for dissolving the crude material.

The warm solution of phthalic anhydrid and accompanying impurities is passed through another series of tanks substantially like the ones used for solution and which are kept at about 70° centigrade. These tanks each contain a charge of decolorizing charcoal to adsorb the color from the carbon tetrachlorid solution.

The carbon tetrachlorid solution, nearly decolorized, is next passed through a series of tanks substantially the same as those used for solution and for decolorizing, but of such design and with such accessories that different tanks in the series may be kept at a temperature ranging from —10° centigrade to 70° and that the formation and removal of crystals is facilitated. Each tank in this series is maintained at a temperature somewhat lower than the tank preceding it in the series; so that successive crops of crystals are formed in each tank by the successive lowering of temperature. The drop in temperature from one tank to another is so graduated that the crystals formed at the highest temperatures are practically pure phthalic anhydrid, while the crystals or precipitated masses formed at the lowest temperatures consist of the impurities practically free from phthalic anhydrid.

The purest crystals of phthalic anhydrid are removed, and washed if necessary with cold carbon tetrachlorid. The crystal masses which contain phthalic anhydrid together with substantial quantities of impurities are returned to the beginning of the process and worked up with the crude material. The precipitated masses which are practically free from phthalic anhydrid are not again introduced into the process. The mother liquor, consisting of carbon tetrachlorid containing small proportions of impurities is used again as a solvent for the crude phthalic anhydrid.

We have discovered that the process as above described may be varied in many ways and yet will produce phthalic anhydrid of high purity. Thus, other non-aqueous solvents such as petroleum distillates (gasolene, kerosene, or other solvent having a desired boiling point) acetone, benzene, carbon disulfid, and chloroform, may be substituted wholly or in part for the carbon tetrachlorid, except that the temperatures for solution, decolorization, and crystallization must be varied somewhat. One advantage in the use of petroleum distillates or carbon disulfid is that these solvents dissolve less color from crude phthalic anhydrid than do other solvents.

The use of a decolorizing agent may be omitted if a colorless product is not desired or if more than one crystallization is made from a solvent dissolving little color. Other decolorizing agents such as fullers' earth may be substituted wholly or in part for the decoloring charcoal. The decolorizing agent may be introduced directly into the dissolving tanks.

The solvent may be partially distilled off at any stage of the process for the purpose of concentrating the solutions or obtaining a purer solvent for the crude phthalic anhydrid.

Having thus described our invention, we claim—

1. A process for the purification of phthalic anhydrid, which process consists in treating phthalic anhydrid and the substances which commonly accompany it in the crude state with a non-aqueous solvent, at a temperature above 30° centigrade, filtering, treating the solution with a substance capable of adsorbing color from non-aqueous solutions, crystallizing phthalic anhydrid from the partially decolorized solution by lowering the temperature, separating out the impurities by further lowering the temperature, and using the mother liquor again to dissolve the crude material.

2. A process for the purification of phthalic anhydrid, which process consists in treating phthalic anhydrid and the substances which commonly accompany it in the crude state with carbon tetrachlorid, at a temperature above 30° centigrade, filtering, treating the solution with a substance capable of adsorbing color from carbon tetrachlorid, crystallizing phthalic anhydrid from the partially decolorized solution by lowering the temperature, separating out the impurities by further lowering the temperature and using the mother liquor again to dissolve the crude material.

3. A process for the purification of phthalic anhydrid, which process consists in treating phthalic anhydrid and the substances which commonly accompany it in the crude state with a non-aqueous solvent, at a temperature above 30° centigrade, treating the solution with a substance capable of adsorbing color from non-aqueous solutions, crystallizing phthalic anhydrid from the partially decolorized solution by lowering the temperature, separating out the impurities by further lowering the temperature, and using the mother liquor again to dissolve the crude material.

4. A process for the purification of phthalic anhydrid, which process consists in treating phthalic anhydrid and the substances which commonly accompany it in the crude state with a non-aqueous solvent at a temperature above 30° centigrade, filtering, treating the solution with decolorizing charcoal, crystallizing phthalic anhydrid from the partially decolorized solution by lowering the temperature, separating out the impurities by further lowering the temperature, and using the mother liquor again to dissolve the crude material.

5. A process for the purification of phthalic anhydrid, which process consists in treating phthalic anhydrid and the substances which commonly accompany it in the crude state with a non-aqueous solvent, at a temperature above 30° centigrade, crystallizing the phthalic anhydrid from the solution by lowering the temperature, separating out the impurities by further lowering the temperature, and using the mother liquor again to dissolve the crude material.

6. A process for the purification of phthalic anhydrid, which process consists in treating phthalic anhydrid and the substances which commonly accompany it in the crude state with a non-aqueous solvent, at a temperature above 30° centigrade, filtering, treating the solution with a substance capable of adsorbing color from non-aqueous solutions, crystallizing phthalic anhydrid from the partially decolorized solution, separating out the impurities by distilling the solvent away from the impurities, and using the distillate again to dissolve the crude material.

7. A process for the purification of crude phthalic anhydrid, which process consists in treating phthalic anhydrid and the substances which commonly accompany it in the crude state, with carbon tetra-chlorid at a temperature above 30° C., filtering, treating the solution with decolorizing charcoal, crystallizing phthalic anhydrid from the partially decolorized solution by lowering the temperature, crystallizing phthalic anhydrid mixed with impurities from the solution by further lowering the temperature, returning this impure phthalic anhydrid to the beginning of the process to be worked up with the crude product, separating impurities from the mother liquor by again lowering the temperature and using the mother liquor again to dissolve the crude material.

In testimony whereof, we affix our signatures in the presence of two subscribing witnesses.

COURTNEY CONOVER.
HARRY D. GIBBS.

Witnesses:
JOSEPH A. AMBLER,
LAURA A. SKINNER.